United States Patent
Zhao et al.

(10) Patent No.: US 11,290,889 B2
(45) Date of Patent: Mar. 29, 2022

(54) METHOD, APPARATUS, AND COMPUTER READABLE STORAGE MEDIUM FOR RESOURCE ALLOCATION AMONG NETWORK SLICES

(71) Applicant: Nokia Shanghai Bell Co., Ltd., Shanghai (CN)

(72) Inventors: Kun Zhao, Shanghai (CN); Lingfeng Lin, Shanghai (CN); Ling Lv, Shanghai (CN); Shaoshuai Fan, Beijing (CN); Hui Tian, Beijing (CN); Pengtao Zhao, Beijing (CN); Zhiqian Huang, Beijing (CN); Gang Ling, Shanghai (CN); Bi Wang, Shanghai (CN)

(73) Assignee: NOKIA SHANGHAI BELL CO., LTD., Shanghai (CN)

(*) Notice: Subject to any disclaimer, the term of this patent is extended or adjusted under 35 U.S.C. 154(b) by 52 days.

(21) Appl. No.: 16/651,536

(22) PCT Filed: Sep. 30, 2017

(86) PCT No.: PCT/CN2017/105108
§ 371 (c)(1),
(2) Date: Mar. 27, 2020

(87) PCT Pub. No.: WO2019/061529
PCT Pub. Date: Apr. 4, 2019

(65) Prior Publication Data
US 2020/0267557 A1    Aug. 20, 2020

(51) Int. Cl.
*H04W 4/00* (2018.01)
*H04W 16/02* (2009.01)
(Continued)

(52) U.S. Cl.
CPC ......... *H04W 16/02* (2013.01); *H04L 41/0893* (2013.01); *H04L 41/0896* (2013.01);
(Continued)

(58) Field of Classification Search
CPC ..... H04W 16/02; H04W 24/02; H04W 48/18; H04W 28/04; H04W 72/04;
(Continued)

(56) References Cited

U.S. PATENT DOCUMENTS 10,601,932 B2 * 3/2020 Kodaypak ........... H04L 41/0803
10,616,934 B2 * 4/2020 Talebi Fard ........... H04W 48/00
(Continued)

FOREIGN PATENT DOCUMENTS

| CN | 106792739 A | 5/2017 |
|---|---|---|
| CN | 106792888 A | 5/2017 |

(Continued)

OTHER PUBLICATIONS

Interantional Search Report PCT/ISA/210 for International Application No. PCT/CN2017/105108 dated Feb. 14, 2018.
(Continued)

*Primary Examiner* — Phuongchau Ba Nguyen
(74) *Attorney, Agent, or Firm* — Harness, Dickey & Pierce, P.L.C.

(57) ABSTRACT

Embodiments of the present disclosure relate to a method, a device, and a computer-readable storage medium for allocating system resources among a plurality of network slices in a communication network. In the communication network, a network device determines utility values of two network slices. A network slice corresponds to a set of network functions of a set of services served thereby. A utility value of the network slice indicates the level of demand for system resources by the set of services associated with the network slice. The network device determines (Continued)

a difference between the utility values of the two network slices. If the difference exceeds a threshold utility value, the network device re-allocates system resources among the plurality of network slices in the communication network. According to the embodiments, the communication network updates the system resources allocated for the plurality of network slices only when the difference between the utility values of the two network slices exceeds a certain threshold. Hence, the complexity of updating system resource allocation among the plurality of network slices may be reduced by the method according to the embodiments of the present disclosure.

13 Claims, 2 Drawing Sheets

(51) Int. Cl.
*H04L 41/0893* (2022.01)
*H04L 41/0896* (2022.01)
*H04L 41/5051* (2022.01)
*H04W 24/02* (2009.01)
*H04W 48/18* (2009.01)

(52) U.S. Cl.
CPC ......... *H04L 41/5051* (2013.01); *H04W 24/02* (2013.01); *H04W 48/18* (2013.01)

(58) Field of Classification Search
CPC ........................... H04W 72/042; H04W 88/08; H04L 41/0893; H04L 41/0896; H04L 41/5051; H04L 43/16; H04L 41/5054; H04L 5/0007

See application file for complete search history.

(56) References Cited

U.S. PATENT DOCUMENTS

| | | | |
|---|---|---|---|
| 10,764,789 B2* | 9/2020 | Qiao | H04W 28/0268 |
| 11,153,813 B2* | 10/2021 | Qiao | H04W 48/18 |
| 2016/0352645 A1* | 12/2016 | Senarath | H04L 47/41 |
| 2017/0079059 A1 | 3/2017 | Li et al. | |
| 2017/0093741 A1 | 3/2017 | Chin et al. | |
| 2017/0208019 A1* | 7/2017 | Shimojou | H04L 41/0896 |
| 2017/0257870 A1 | 9/2017 | Farmanbar et al. | |
| 2018/0123961 A1* | 5/2018 | Farmanbar | H04L 43/0888 |
| 2019/0174498 A1* | 6/2019 | Samdanis | H04W 72/0453 |
| 2019/0208438 A1* | 7/2019 | Yang | H04L 43/16 |
| 2021/0136680 A1* | 5/2021 | Browne | H04L 41/5019 |
| 2021/0185695 A1* | 6/2021 | Gupta | H04W 24/04 |
| 2021/0194771 A1* | 6/2021 | Sridhar | H04L 41/0893 |

FOREIGN PATENT DOCUMENTS

| | | | | |
|---|---|---|---|---|
| CN | 106954267 A | | 7/2017 | |
| CN | 107071782 A | | 8/2017 | |
| CN | 111555910 A | * | 8/2020 | ............ H04L 12/24 |

OTHER PUBLICATIONS

Extended European Search Report dated Apr. 6, 2021 for corresponding European Application No. 17926390.0.
A. Gebremariam et al. 'Resource Pooling via Dynamic Spectrum-level Slicing across Heterogeneous Networks' *IEEE*, 2017, pp. 818-823.
J. He et al. 'AppRAN: Application-Oriented Radio Access Network Sharing in Mobile Networks' *IEEE*, 2015, pp. 3788-3794.
Office Action dated Jan. 6, 2022 in Chinese Application No. 201780095042.
Lun Tang et al., "Virtual Resource Allocation Algorithm for Network Utility Maximization Based on Network Slicing," Journal of Electronics & Information Technology, vol. 39, No. 8, pp. 1812-1818, Aug. 2017.

* cited by examiner

METHOD, APPARATUS, AND COMPUTER READABLE STORAGE MEDIUM FOR RESOURCE ALLOCATION AMONG NETWORK SLICES

CROSS-REFERENCE TO RELATED APPLICATIONS

This application is a national phase under 35 U.S.C. § 371 of PCT International Application No. PCT/CN2017/105108 which has an International filing date of Sep. 30, 2017, the entire contents of each of which are hereby incorporated by reference.

FIELD

Embodiments of the present disclosure generally relate to communication network technologies, and more specifically to a method, a device, and a computer-readable storage medium for allocating system resources among a plurality of network slices in a communication network.

BACKGROUND

With the development of wireless communication technology, the volume of mobile communication is growing. To alleviate these pressures, the 3rd generation partnership project (3GPP) is developing the 5th generation (5G) mobile communication standard. The international telecommunication union radiocommunication sector (ITU-R) has proposed three typical application scenarios for 5G communication, namely enhanced mobile broadband communication (eMBB), massive machine type of communication (mMTC), and ultra-reliable low latency communications (uRLLC). Different types of application scenarios have different requirements in terms of mobility, security, policy control, delay, reliability, and the like. Currently, the existing architecture of the communication networks is relatively single. Such a network architecture lacking flexibility is insufficient to support requirements of broader service performance and scalability.

SUMMARY

In a first aspect of the present disclosure, there is provided a method implemented at a network device in a communication network. The method comprises: determining a first utility value of a first network slice and a second utility value of a second network slice of the communication network. A network slice corresponds to a set of network functions for a set of services. A utility value of the network slice indicates a level of demand for system resources of the communication network by the set of services associated with the network slice. The network device determines a difference between the first utility value and the second utility value. In response to the difference exceeding a threshold utility value, the network device updates system resources for a plurality of network slices of the communication network.

In a second aspect of the present disclosure, there is provided a network device in a communication network. The network device comprises: a processor, and a memory storing instructions which, when executed by the processor, cause the network device to perform the acts: determining a first utility value of a first network slice and a second utility value of a second network slice of the communication network, a network slice corresponding to a set of network functions for a set of services, a utility value of the network slice indicating a level of demand for system resources of the communication network by the set of services associated with the network slice; determining a difference between the first utility value and the second utility value; and in response to the difference exceeding a threshold utility value, updating system resources for a plurality of network slices of the communication network.

In a third aspect of the present disclosure, there is provided a computer-readable storage medium. The computer-readable storage medium comprises program code stored thereon which, when executed by a device, causes the device to perform the method of the first aspect.

It should be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

The above and other objectives, features, and advantages of example embodiments of the present disclosure will become more apparent from the following detailed description with reference to the accompanying drawings. In the figures, several embodiments of the present disclosure are illustrated in an exemplary but non-restrictive manner, wherein.

Throughout all figures, identical or similar reference numbers are used to represent identical or similar elements.

DETAILED DESCRIPTION OF EMBODIMENTS

Embodiments of the present disclosure will be described in more detail below with reference to the figures. Although the figures show certain embodiments of the present disclosure, it should be appreciated that the present disclosure may be implemented in various forms and should not be construed as being limited to the embodiments set forth herein. On the contrary, these embodiments are provided for more thorough and complete understanding of the present disclosure. It should be appreciated that the figures and embodiments of the present disclosure are only for exemplary purposes, and are not intended to limit the protection scope of the present disclosure.

The term "network device" used herein refers to any suitable entity or device capable of providing a cell or coverage such that a terminal device can access a network through it or receive services from it. Examples of the network device include a base station. The term "base station" (BS) used herein may represent a Node B (NodeB or NB), an evolved Node B (eNodeB or eNB), a remote radio unit (RRU), a radio head (RH), a remote radio head RRH), a repeater, or a low-power node such as a pico base station, a femto base station, and so on.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation."

For the purpose of explanation, some embodiments of the present disclosure are introduced in the text herein against the background of wireless communication (such as cellular communication), and terms in long-term evolution/long-term evolution-advanced (LTE/LTE-A) or 5G developed for example by 3GPP are used herein. However, as can be understood by persons skilled in the art, the embodiments of the present disclosure are by no means limited to wireless communication systems complying with the wireless communication protocol formulated by 3GPP, but may be applied to any communication system having similar problems, such as WLAN, wired communication systems, or other communication systems to be developed in the future.

Figure 1:
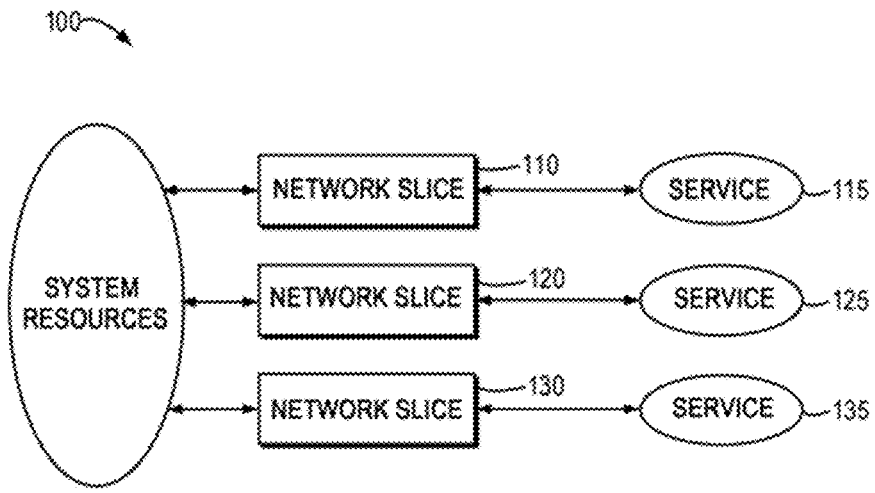
FIG. 1 illustrates a schematic diagram of a communication network including a plurality of network slices.

FIG. 1 illustrates a schematic diagram of a communication network 100 including a plurality of network slices. In this example, the communication network 100 may include a plurality of network slices, for example, network slices 110, 120 and 130 as shown in FIG. 1. A network slice corresponds to a set of network functions for a set of services. A network slice may be logically or physically mapped to a plurality of access and transmission technologies of a radio access network or a core network of a communication network. In some embodiments of the present disclosure, the network slices 110, 120 and 130 may correspond to network functions of a radio access network (RAN) in the communication network 100. For example, for the LTE communication network, the network functions corresponding to the network slices 110, 120 and 130 may include, but are not limited to, a physical layer (PHY) function, a media access control (MAC) layer function, and a radio link control (RLC) layer function, a packet data convergence protocol (PDCP) layer function, and a radio resource control (RRC) layer function. In particular, the above network slices 110, 120 and 130 may be implemented logically by using a virtual network slice technology, or may be implemented physically by using different hardware resources. In addition, the network slices 110, 120 and 130 may include the same or different radio access functions, and may share system resources of the communication network 100, including, but is not limited to, processing resources, storage resources, signaling resources, radio physical transmission resources, radio access technology and infrastructure for the radio access network. In terms of the implementation of the network functions corresponding to the network slices, the present disclosure does not impose any limitations.

The network slices 110, 120 and 130 correspond to services 115, 125 and 135, respectively. The services 115, 125 and 135 may each represent a communication service or a set of communication services with similar quality of service requirements. For example, the network slice 110 provides a specific network service for the service 115. The service 115 may correspond to one communication service or a set of communication services with specific quality of service requirements. In another example, the service 115 may also correspond to a set of communication users with a specific service priority. In particular, the functional configuration and system resource allocation of the network slice 110 may be optimized based on the specific quality of service (QoS) requirement of the service 115 in order to provide a customized network service to the service 115.

It should be appreciated that the number of network slices and services shown in FIG. 1 is only for the purposes of illustration, and is not intended to be limiting. The communication network 100 may include any suitable number of network slices, and one network slice may also serve a plurality of sets of services.

The communication in the communication network 100 may follow any suitable radio access technology and corresponding communication standards. Examples of radio access networks include, but is not limited to, a long term evolution (LTE) network, a LTE-Advanced (LTE-A) network, a wideband code division multiple access (WCDMA) network, a code division multiple access (CDMA) network, a global system for mobile communications (GSM) network, an orthogonal frequency division multiplexing (OFDM) network, a wireless local area network (WLAN), a world interoperability for microwave access (WiMAX) network, a Bluetooth network, a Zigbee technology network, a machine type communication (MTC) network, a D2D network, a M2M network, and so on. Moreover, the communication service corresponding to a network slice may be based on any appropriate communication protocol, including, but is not limited to, the transmission control protocol (TCP)/Internet protocol (IP), hypertext transfer protocol (HTTP), user datagram protocol (UDP), session description protocol (SDP), and so on.

In a communication network, a plurality of network slices share system resources of the communication network. The network performance of network slices and the communication services served may change in real time, so the system resources of the plurality of network slices may need to be updated frequently. This causes excessive computational complexity and consumes excessive computing and storage resources. In addition, because different services have different priorities or different quality of service requirements, how to consider the priority requirements of different services and the fairness between different network slices in the resource allocation process is a problem to be solved in the network slice technology.

In order to at least partially solve the above and other potential problems, according to embodiments of the present disclosure, a system resource allocation solution for a plurality of network slices is proposed based on a specific event trigger. According to the embodiments described herein, a network device determines the utility values of network slices in the communication network to determine the level of demand of the services associated with the network slices for system resources. Based on the determined utility values, the network device determines a difference between the utility values of two network slices. In the case where the difference exceeds a certain threshold utility value, the network device reallocates system resources for the plurality of network slices. By this method, the network device updates the system resources of the plurality of network slices in the communication network only if the difference in utility values between the two network slices exceeds a certain threshold. Therefore, by the method described in the present disclosure, the number of times that the allocated system resources are adjusted for the plurality of network slices may be reduced, such that the calculation amount for updating the system resources is reduced.

Figure 2:
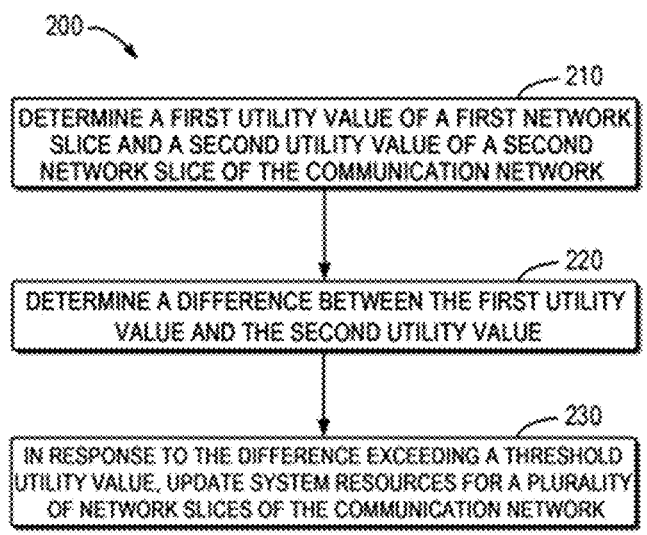
FIG. 2 illustrates a flowchart of an example method implemented at a network device in a communication network according to some embodiments of the present disclosure.

FIG. 2 illustrates a flowchart of an example method implemented at a network device in a communication network according to some embodiments of the present disclosure. The method 200 shown in FIG. 2 may be performed, for example, at a network device or other suitable devices of the communication network 100, such as a suitable device on the core network side. According to an embodiment of the present disclosure, the communication network 100 may be logically or physically divided into a plurality of network slices through a network slice technology. A network slice corresponds to a set of network functions for a set of services. The network functions may include network functions of one or more radio access networks. In particular, the network functions corresponding to the network slices may be configured according to the quality of service requirements of the communication services served by the network slices and the system configuration of the network slices.

As shown in FIG. 2, at block 210, the network device determines a utility value (referred to as "the first utility value") of one network slice (referred to as "the first network slice") and another utility value (referred to as "the second utility value") of another network slice (referred to as "the second network slice"). The utility values of network slices may be used to measure the level of demand for the system resources of the communication network 100 by the set of services associated with the network slices. The higher the utility value of a network slice, the higher the level of demand for the resources by the set of services corresponding to the network slice. During the update of system resources, the network device allocates more system resources to the network slice with a higher utility value.

In some embodiments of the present disclosure, in order to determine the utility value of a certain network slice, the network device determines a set of utility parameters for the network slice. The set of utility parameters includes, but is not limited to, an amount of allocated system resources for the network slice, an amount of demand for the system resources by the network slice, and a priority of the network slice. The priority of the network slice may be represented by a priority parameter of the network slice. The priority parameter may be determined based on the set of services associated with the network slice. Based on the set of utility parameters of the network slice, the network device determines the utility value of the network slice.

In some examples, the utility value of a network slice may be determined by the following Equation (1):

$$U(c) = \frac{1}{1 + \exp[-A(c - d)]} \quad (1)$$

where c represents the amount of allocated system resources for the network slice, d represents the amount of demand for the system resources by the network slice, and A represents the priority parameter of the network slice. It can be found from Equation (1) that the larger the priority parameter A, the higher the utility value of the network slice, that is, the higher the level of demand for the system resources by the service served by the network slice. During the update of the system resources, the network device will allocate more system resources to the network slice with a higher priority. It should be noted that specific details of the system resources update will be given below. In addition, it should be pointed out that the above Equation (1) is only an exemplary equation for calculating the utility value of the network slice. Persons of ordinary skill in the art may use various utility formulas according to needs to measure the degree of the demand of different network slices for the system resources.

At block 220, the network device determines the difference between the first utility value and the second utility value. In some embodiments of the present disclosure, at the system level, the difference between the utility values of the two network slices represents the fairness of the system resource allocation for the two network slices. By determining the utility values of the network slices and obtaining the difference between the utility values of two network slices, the network device may obtain the fairness information of system resource allocation for the plurality of network slices of the communication network at the system level. Therefore, the network device may use the difference between utility values of the network slices as a trigger condition for reallocating system resources for the plurality of network slices, thereby realizing the fairness of resource allocation between different network slices. It should be pointed out that compared with adjusting system resources for the plurality of slices in real time or periodically, the system resource update method described in the text herein is triggered based on the difference between the utility values of network slices, thereby reducing the frequency of updating system resources and reducing the computing amount of the network device.

At block 230, in the case where the difference between the above utility values exceeds a threshold utility value, the network device updates system resources for the plurality of network slices. From the above discussion, the difference between the utility values of the two network slices exceeds the threshold utility value, which means that the unfairness between network slices of the communication network exceeds a predetermined threshold. In this case, the network device will reallocate system resources for the plurality of network slices to achieve fairness of system resource allocation between the plurality of network slices again.

In some embodiments of the present disclosure, in order to update system resources for the plurality of network slices, the network device determines system resources for each of the plurality of network slices such that the utility values of the plurality of network slices are equal, and the sum of the amounts of system resources determined for the plurality of network slices is equal to a predetermined amount of the system resources. As described above, the utility value of the network slice represents the level of demand for the system resources of the communication network by the set of services in each network slice. During the update of the system resources, the equal utility value of the plurality of network slices means that the fairness of resource allocation is achieved among the plurality of network slices through the reallocation of system resources. Based on the system resources determined for each network slice, the network device reallocates the corresponding system resources for each network slice.

Without loss of generality, it is assumed that there are three network slices in the communication network 100, for example, the network slices 110, 120, and 130 shown in FIG. 1. For the system resource update for the three network slices, the condition represented by the following Equation (2) needs to be satisfied:

$$\begin{cases} U_1 = U_2 = U_3 \\ c_1 + c_2 + c_3 = R \end{cases} \quad (2)$$

where $U_1$, $U_2$, and $U_3$ respectively represent the utility values of network slices 110, 120, and 130 after the system resources are updated, $c_1$, $c_2$, and $c_3$ respectively represent the amount of allocated system resources for the network slices 110, 120 and 130 obtained by the resource update method described in the present disclosure, and R represents a predetermined amount of system resources. Through the above Equation (2), it may be found that equal utility values between the plurality of network slices can be achieved with the system resource allocation method described in some embodiments of the present disclosure, and thus may guarantee fairness between different network slices.

In the case where the utility value of the network slice is measured according to the above Equation (1), the amount of allocated system resources for the three network slices shown by the following Equation (3) may be obtained through mathematical calculations according to Equation (1) and Equation (2):

$$\begin{cases} c_1 = \frac{A_2 A_3}{A_1 A_2 + A_1 A_3 + A_2 A_3}[R - (d_2 + d_3)] + \frac{A_1 A_2 + A_1 A_3}{A_1 A_2 + A_1 A_3 + A_2 A_3} d_1 \\ c_2 = \frac{A_1 A_3}{A_1 A_2 + A_1 A_3 + A_2 A_3}[R - (d_1 + d_3)] + \frac{A_1 A_2 + A_2 A_3}{A_1 A_2 + A_1 A_3 + A_2 A_3} d_2 \\ c_3 = \frac{A_1 A_2}{A_1 A_2 + A_1 A_3 + A_2 A_3}[R - (d_1 + d_2)] + \frac{A_1 A_3 + A_2 A_3}{A_1 A_2 + A_1 A_3 + A_2 A_3} d_3 \end{cases} \quad (3)$$

where $A_1$, $A_2$ and $A_3$ represent the priority parameters of network slices 110, 120, and 130, respectively, and $d_1$, $d_2$ and $d_3$ represent the amount of demand for the system resources by the network slices 110, 120 and 130, respectively. It should be noted that the above examples describe the system resource update method according to some embodiments of the present disclosure with respect to three network slices, but the present disclosure is not limited thereto. According to the method described in this disclosure, persons skilled in the art may obtain a method for updating system resources for any number of network slices.

In some examples, in the system resource update for the plurality of network slices, the network device will reserve a certain amount of system resources for, for example, creating new network slices. In other examples, the network device does not reserve any system resource, but allocates all system resources of the communication network to the existing plurality of network slices to maximize the utilization of the system resources of the communication network.

According to some embodiments of the present disclosure, the system resources of the communication network 100 may include any resource that may be expressed quantitatively in a numerical manner. The system resources may include computing resources, storage resources, signaling resources, physical resource elements (PRE), physical resource blocks (PRB), and the like. The system resources may also be various combinations of the above resources. In some examples, the utility values of the network slices may be determined respectively for the plurality of system resources. In other examples, based on different application scenarios, different utility values may be used as trigger conditions for updating the system resources. For example, for a communication network with limited computing resources, the computing resources may be used as the system resources. In this case, the network device may allocate the computing resources of the communication network among the plurality of network slices. For another example, for a communication network with limited physical transmission resources, the network device may use physical resource blocks as the system resources, and allocate the physical resource blocks of the communication network among the plurality of network slices.

In some embodiments of the present disclosure, the network functions corresponding to a network slice may include the functions of a radio access network. As described above, the network function may include the functions of the radio access network such as a physical layer, a media access control layer, a radio link layer, a packet data convergence protocol layer, a radio resource control layer, and so on. In this embodiment, the network slice of the communication network will be implemented in the radio access network. It should be noted that in an actual network deployment, the service range of a network slice may be configured nationwide or only locally. Therefore, if the network slice involves the core network function configuration and resource division, the system configuration portion of the core network of the communication network may be affected. Therefore, the system configuration of the core network will not be affected by the implementation of the network slice described in the above embodiments, that is, the configuration and functional division of the network slices are transparent to the core network, thereby achieving a network slice design which is more flexibly and easily expanded.

With the method 200 shown in FIG. 2, the network device may re-allocate system resources for the plurality of network slices in the communication network only when the difference between the utility values of two network slices exceeds a certain threshold. Therefore, compared with adjusting the allocated system resources for the plurality of network slices in real time or periodically, with the method described in the embodiments of the present disclosure, the number of times that system resources are updated for the plurality of network slices may be reduced, such that the complexity in allocating the system resources is reduced. In addition, in some embodiments of the present disclosure, the method for updating system resources may consider fairness among the plurality of network slices, thereby avoiding the case that the network slice corresponding to a low-priority service fails to obtain sufficient system resources.

Figure 3:
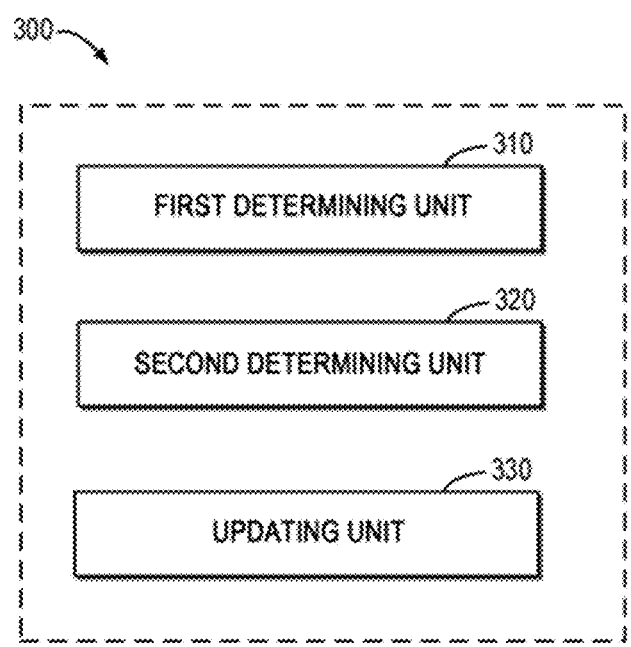
FIG. 3 illustrates a block diagram of a device implemented at a network device in a communication network according to an embodiment of the present disclosure.

FIG. 3 illustrates a block diagram of a device 300 implemented at a network device according to an embodiment of the present disclosure. In some embodiments, the device 300 may be implemented at, for example, the network device of the communication network 100 shown in FIG. 1. As shown in the figure, the device 300 may include the first determining unit 310 configured to determine the first utility value of the first network slice and the second utility value of the second network slice of the communication network. A network slice corresponds to a set of network functions for a set of services. A utility value of the network slice indicates the level of demand for the system resources of the communication network by the set of services associated with the network slice.

The device 300 may further include the second determining unit 320 configured to determine the difference between the first utility value and the second utility value. The device 300 may further include an updating unit 330 configured to update system resources for the plurality of network slices in response to the difference exceeding a threshold utility value.

For the purpose of clarity, some optional modules of the device 300 are not shown in FIG. 3. However, it should be appreciated that the various features described above with reference to FIG. 2 are also applicable to the device 300. Moreover, each module of the device 300 may be a hardware module or a software module. For example, in some embodiments, the device 300 may be partially or entirely implemented using software and/or firmware, for example, implemented as a computer program product included on a computer-readable medium. Alternatively or additionally, the device 300 may be implemented partially or entirely based on a hardware, e.g., implemented as an integrated circuit (IC), an application specific integrated circuit (ASIC), a system on chip (SOC), a field programmable gate array (FPGA), and the like. The scope of the present disclosure is not limited in this regard.

Figure 4:
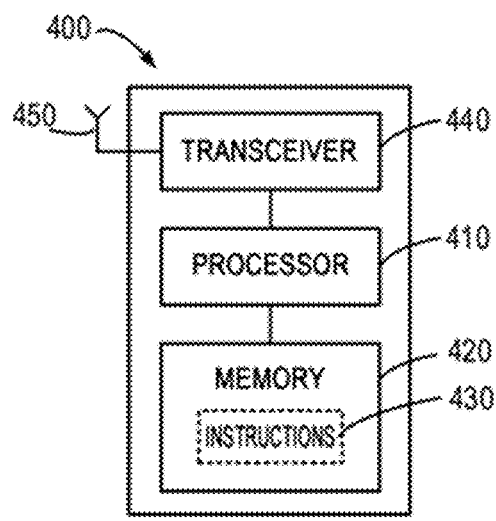
FIG. 4 illustrates a block diagram of a network device in a communication network according to an embodiment of the present disclosure.

FIG. 4 illustrates a block diagram of a network device 400 according to an embodiment of the present disclosure. The network device 400 may be used to implement a network device of the communication network 100 in an embodiment of the present disclosure.

As shown in the example in FIG. 4, the network device 400 includes a processor 410. The processor 410 controls operations and functions of the network device 400. For example, in some embodiments, the processor 410 may perform various operations by means of instructions 430 stored in a memory 420 coupled thereto. The memory 420 may be any suitable type applicable to a local technical environment, and may be implemented using any suitable data storage technology, and may include, but is not limited to, a semiconductor-based storage device, a magnetic storage device and system, an optical storage device and system. Although only one memory unit is shown in FIG. 4, there may be a plurality of physically different memory units in the network device 400.

The processor 410 may be any suitable type applicable to a local technical environment, and may include, but is not limited to, a general-purpose computer, a special-purpose computer, a microcontroller, a digital signal processor (DSP), and one or more cores in a controller-based multi-core controller architecture. The network device 400 may also include a plurality of processors 410. The processors 410 may also be coupled with a transceiver 440 which may implement the reception and transmission of information by means of one or more antennas 450 and/or other components.

According to an embodiment of the present disclosure, the processor 410 and the memory 420 may operate cooperatively to implement the method 200 described above with reference to FIG. 2. It should be appreciated that all the features described above are applicable to the network device 400 and are not repeated herein.

Generally speaking, various example embodiments disclosed herein may be implemented in a hardware or special purpose circuits, a software, logic or any combination thereof. Some aspects may be implemented in a hardware, while other aspects may be implemented in firmware or a software which may be executed by a controller, a microprocessor or other computing devices. While various aspects of the example embodiments disclosed herein are illustrated and described as block diagrams, flowcharts, or using some other pictorial representation, it should be appreciated that the blocks, devices, systems, techniques or methods disclosed herein may be implemented in, as non-limiting examples, a hardware, a software, firmware, special purpose circuits or logic, a general purpose hardware or a controller or other computing devices, or some combination thereof.

As an example, the embodiments of the subject matter disclosed herein can be described in a context of machine-executable instructions which are included, for instance, in the program module executed in the device on a target real or virtual processor. Generally, a program module includes routines, programs, banks, objects, classes, components and data structures, etc. and performs a particular task or implements a particular abstract data structure. In various embodiments, the functions of the program modules may be combined or divided among the described program modules. The machine-executable instructions for the program module may be executed locally or in a distributed device. In the distributed device, the program module may be located in both of the local and remote storage mediums.

The computer program code for implementing the method of the subject matter described herein may be written in one or more programming languages. These computer program codes may be provided to a general-purpose computer, a dedicated computer or a processor of other programmable data processing devices, such that when the program codes are executed by the computer or other programmable data processing devices, the functions/operations prescribed in the flow chart and/or block diagram are caused to be implemented. The program code may be executed completely on a computer, partly on a computer, partly on a computer as an independent software packet and partly on a remote computer, or completely on a remote computer or a server.

In the context of the subject matter described herein, the machine-readable medium may be any tangible medium including or storing a program for or about an instruction executing system, apparatus or device. The machine-readable medium may be a machine-readable signal medium or a machine-readable storage medium. The machine-readable medium may include, but is not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, a hard drive, a random-access memory (RAM), a read-only memory (ROM), an erasable programmable read-only memory (EPROM or flash memory), an optical storage device, a magnetic storage device, or any appropriate combination thereof.

Besides, although the operations are depicted in a particular order, it should not be understood that such operations are completed in a particular order as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any disclosure or claims, but should be explained as a description for a particular implementation of a particular invention. In the present description, some features described in the context of separate embodiments may also be integrated into a single implementation. On the contrary, various features described in the context of a single implementation may also be separately implemented in a plurality of embodiments or in any suitable sub-group.

Although the subject matter has been described in language specific to structural features and/or methodological actions, it should be appreciated that the subject matters specified in the appended claims are not limited to the specific features or actions described above. Rather, the specific features and actions described above are disclosed as example forms of implementing the claims.

We claim:

1. A method implemented at a network device in a communication network, comprising:
    determining a first utility value of a first network slice and a second utility value of a second network slice of the communication network, a network slice corresponding to a set of network functions for a set of services, a utility value of the network slice indicating a level of demand for system resources of the communication network by the set of services associated with the network slice;

determining a difference between the first utility value and the second utility value; and in response to the difference exceeding a threshold utility value, updating system resources for a plurality of network slices of the communication network.

2. The method of claim 1, wherein determining the first utility value of the first network slice of the communication network comprises:

determining a set of utility parameters for the first network slice, the set of utility parameters comprising at least one of: an amount of allocated system resources for the first network slice, an amount of demand for the system resources by the first network slice, and a priority of the first network slice, a priority of a network slice being associated with a set of services of the network slice; and determining the first utility value of the first network slice based on the set of utility parameters.

3. The method of claim 1, wherein updating the system resources for the plurality of network slices comprises:

determining system resources for each of the plurality of network slices, such that utility values of the plurality of network slices are equal, and a sum of amounts of the system resources determined for the plurality of network slices is equal to a predetermined amount of system resources of the communication network; and allocating system resources for each network slice based on the determined system resources for each network slice.

4. The method of claim 3, wherein the predetermined amount of system resources of the communication network is a total amount of system resources of the communication network.

5. The method of claim 1, wherein the system resources of the communication network comprise at least one of:
computing resources,
storage resources,
signaling resources,
a physical resource element, and
a physical resource block.

6. The method of claim 1, wherein the set of network functions of the network slice corresponds to network functions of a radio access network.

7. A network device in a communication network, comprising:
a processor; and
a memory storing instructions which, when executed by the processor, cause the network device to perform acts comprising:

determining a first utility value of a first network slice and a second utility value of a second network slice of the communication network, a network slice corresponding to a set of network functions for a set of services, a utility value of the network slice indicating a level of demand for system resources of the communication network by the set of services associated with the network slice;

determining a difference between the first utility value and the second utility value; and in response to the difference exceeding a threshold utility value, updating system resources for a plurality of network slices of the communication network.

8. The network device of claim 7, wherein determining the first utility value of the first network slice of the communication network comprises:

determining a set of utility parameters for the first network slice, the set of utility parameters comprising at least one of: an amount of allocated system resources for the first network slice, an amount of demand for the system resources by the first network slice, and a priority of the first network slice, a priority of a network slice being associated with a set of services of the network slice; and determining the first utility value of the first network slice based on the set of utility parameters.

9. The network device of claim 7, wherein updating the system resources for the plurality of network slices comprises:

determining system resources for each of the plurality of network slices, such that utility values of the plurality of network slices are equal, and a sum of amounts of system resources determined for the plurality of network slices is equal to a predetermined amount of system resources of the communication network; and allocating system resources for each network slice based on the determined system resources for each network slice.

10. The network device of claim 9, wherein the predetermined amount of system resources of the communication network is a total amount of system resources of the communication network.

11. The network device of claim 7, wherein the system resources of the communication network comprise at least one of:
computing resources,
storage resources,
signaling resources,
a physical resource element, and
a physical resource block.

12. The network device of claim 7, wherein the set of network functions of the network slice corresponds to network functions of a radio access network.

13. A computer-readable storage medium comprising program code stored thereon which, when executed by a device, causes the device to perform the method of claim 1.

* * * * *